US009950598B2

(12) United States Patent
Stickles et al.

(10) Patent No.: US 9,950,598 B2
(45) Date of Patent: Apr. 24, 2018

(54) INTEGRATED ROD ATTACHMENT TOP

(71) Applicant: Bestop, Inc., Louisville, CO (US)

(72) Inventors: George C. Stickles, Thornton, CO (US); Jose N. Vigil, Westminster, CO (US); Dorothy N. Kohn, Longmont, CO (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/313,768

(22) PCT Filed: May 26, 2015

(86) PCT No.: PCT/US2015/032394
§ 371 (c)(1),
(2) Date: Nov. 23, 2016

(87) PCT Pub. No.: WO2015/179859
PCT Pub. Date: Nov. 26, 2015

(65) Prior Publication Data
US 2017/0197497 A1    Jul. 13, 2017

Related U.S. Application Data

(60) Provisional application No. 62/002,293, filed on May 23, 2014.

(51) Int. Cl.
*B60J 7/10*    (2006.01)
*B60J 7/12*    (2006.01)

(52) U.S. Cl.
CPC .............. *B60J 7/104* (2013.01); *B60J 7/1291* (2013.01)

(58) Field of Classification Search
CPC .................. B01J 7/014; B01J 7/1291
(Continued)

(56) References Cited

U.S. PATENT DOCUMENTS 2,708,137 A * 5/1955 Poelman .................. B60J 7/123
                                                              296/107.06
2,960,137 A * 11/1960 Lipsitz .................... A45C 11/38
                                                                 150/108
2008/0231073 A1    9/2008 Essig et al.

FOREIGN PATENT DOCUMENTS

GB          943654 A       12/1963

OTHER PUBLICATIONS

International Search Report for International Application No. PCT/US2015/032394, dated Sep. 18, 2015.
(Continued)

*Primary Examiner* — Dennis H Pedder
(74) *Attorney, Agent, or Firm* — Warn Partners, P.C.

(57) ABSTRACT

A cover assembly (10) for a vehicle having an integrated fiber windshield rod (14) that is connected to a windshield area and held in place using windshield footman loop portions (22) eliminating the need for a windshield channel or windshield header. The windshield footman loop portions (22) have a plate (24) with a snap stud (26) for attaching a snap eyelet (32) of a web strap (30) to secure the fiber windshield rod (14) in place, which is connected to a fabric cover. The cover assembly (10) has a plurality of straps (16, 20) to secure the sides and rear of the cover assembly to sport bars (18, 21) of the vehicle. The fabric cover assembly (10) creates a sun screen and/or soft top liner effect over at least the vehicle cockpit and is storable in the installed position while the vehicle roof hard top roof assembly or soft top roof assembly is also in installed position on the vehicle.

13 Claims, 2 Drawing Sheets

(58) Field of Classification Search
USPC .................. 296/219, 100.15, 100.16, 100.18
See application file for complete search history.

(56) References Cited

OTHER PUBLICATIONS

"Bestop Bikini top and header install," Links4Jeeps, Sep. 17, 2007, XP002743825, Retrieved from the Internet Sep. 1, 2015: URL:http://www.links4jeeps.com/writeups/bikini/bestop_bikini.php.

* cited by examiner

INTEGRATED ROD ATTACHMENT TOP

CROSS-REFERENCE TO RELATED APPLICATIONS

This application is a National Stage of International Application No. PCT/US2015/032394, filed May 26, 2015, which claims the benefit of U.S. Provisional Patent Application No. 62/002,293, filed May 23, 2014. The disclosures of the above applications are incorporated herein by reference.

FIELD OF THE INVENTION

The present invention relates to a soft weather shield system for a cockpit of a vehicle.

BACKGROUND OF THE INVENTION

Roof soft top and hard top assemblies are commonly used in two-door and four-door sport-utility vehicles. The soft top and hard top roof assemblies cover the cockpit to protect the occupants of the vehicle from various weather conditions. However, there are occasions where the weather is pleasant, and it is desired by the occupant of the vehicle to move the soft top roof assembly to an open position, or remove one or more hard top roof panels from the vehicle, such that the vehicle essentially functions without part of a roof, and the cockpit driver/passenger compartment of the vehicle is exposed to the atmosphere. This provides an open air feel and allows the occupants of the vehicle to enjoy more favorable weather conditions while driving.

There are times when a vehicle occupant desires to have this open air feel but with a diffusion of wind and sun in the cockpit to reduce wind noise and sun rays. Fabric covers can be added to help diffuse wind and block the sun. Typical fabric covers used to cover the top of the driver/passenger use a series of bungee cord-like fasteners to attach the fabric cover to the sport bars. Additional cords attach the fabric cover to the windshield area, e.g., to a windshield header. One of the disadvantages of typical fabric covers is the headroom due to the fabric is centerline of the sport bar. Another of the disadvantages is the fabric cover leaves gaps along the front, both sides, and the rear of the cover and therefore does not cover the entire area over the driver/passenger compartment well.

Another known cover assembly having a top or cover is provided where one or more installed windshield channel or windshield header features retain or otherwise connect to the front edge area of a fabric cover, and is/are secured to the windshield frame, e.g., the cover assembly and channels utilize securing features such as latches, threaded knobs, screws, straps, etc. By way of example, windshield channel(s) must be installed to the windshield frame, and the cover assembly attached thereto. Typically, the sides of the fabric cover are also connected to the sport bars, and the rearward edge of the cover is also attached, e.g., to sport bar(s) and/or to the rearward of the vehicle. While this cover assembly provides superior coverage essentially of the cockpit compartment compared to the aforementioned problematic fabric cover, there remains a desire to have the ability to fasten the fabric to the windshield area without using a windshield channel or windshield header.

Accordingly, there exists a need for a cover assembly made of a soft and/or mesh fabric material to provide a sun screen or soft top liner that generally covers the top of at least the cockpit area when a soft top assembly or one or more hard top panels of a hard top assembly are in an open air position to reduce wind noise, ultraviolet rays, and debris in the cockpit, while also eliminating the need for a windshield channel or windshield header, latches and knobs.

SUMMARY OF THE INVENTION

The present invention is directed to a fabric cover assembly including a windshield rod, e.g., fiber windshield rod, that is connected to a windshield area and held in place using windshield footman loop portions. The loop portions have a snap stud plate for attaching a snap eyelet of a web strap extending from the fiber windshield rod. The need for metal stamp windshield channels is eliminated. Therefore, a number of corresponding attachment features, such as latches, threaded knobs, and etc, are also eliminated. The fabric cover assembly creates a sun screen and/or soft top liner effect and is selectively stored in the installed position while the hard top roof assembly or soft top roof assembly is in place, e.g., whether in the deployed position covering the cockpit or retracted/removed for the open air feel position. The fabric cover assembly also allows for easy removal, and for folding back of the fabric cover so that original equipment manufacturer (OEM) hard top roof assembly or soft top roof assembly can be installed over the fabric cover assembly so that the fabric cover assembly can be left installed as a liner and/or sunshade when desired.

The fabric cover assembly is made of a soft and/or mesh fabric material to provide a sun screen or soft top liner that substantially covers the top of the cockpit area, or of the entire vehicle interior occupant compartments, e.g., front and rear passenger compartments of a 4-door SUV, in another embodiment attaching also toward the rear of the rear passenger compartment. When the soft top assembly or one or more hard top panels of the hard top assembly are folded back, removed or otherwise stowed to provide an open air feel, the fabric cover assembly remains providing wind, sun, particulate/debris diffusion.

Yet another significant benefit of the cover assembly of the present invention is that costs are reduced by eliminating the windshield channel, which are typically metal stamped windshield channels, and/or windshield header. Assembly and vehicle weight is therefore also reduced. In addition, ease of installation is improved since entire components are eliminated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, the present invention provides the ability to the fasten fabric top to the interior windshield area without using a windshield channel or windshield header coupled to the windshield frame. A cover assembly is provided that creates a removable sun screen or soft top liner that is selectively stored in the installed position under a hard top roof assembly or soft top roof assembly. It also allows for easy removal and/or partial fold back of the cover assembly so that OEM fabric soft tops and hard tops can be installed over the fabric so that the cover assembly can be left installed as a liner or sunshade. The present invention eliminates the need for metal stamp windshield channels, latches, knobs, etc, which is a significant benefit over conventional systems. A fiber windshield rod provides structure that conforms fabric of the cover to the windshield contour. A snap stud plate provides secure fastening of the fiber windshield rod to the snap stud plate utilizing a predetermined fabric web strap, e.g., a 1 inch web strap, with mating snap eyelet.

Figure 1:
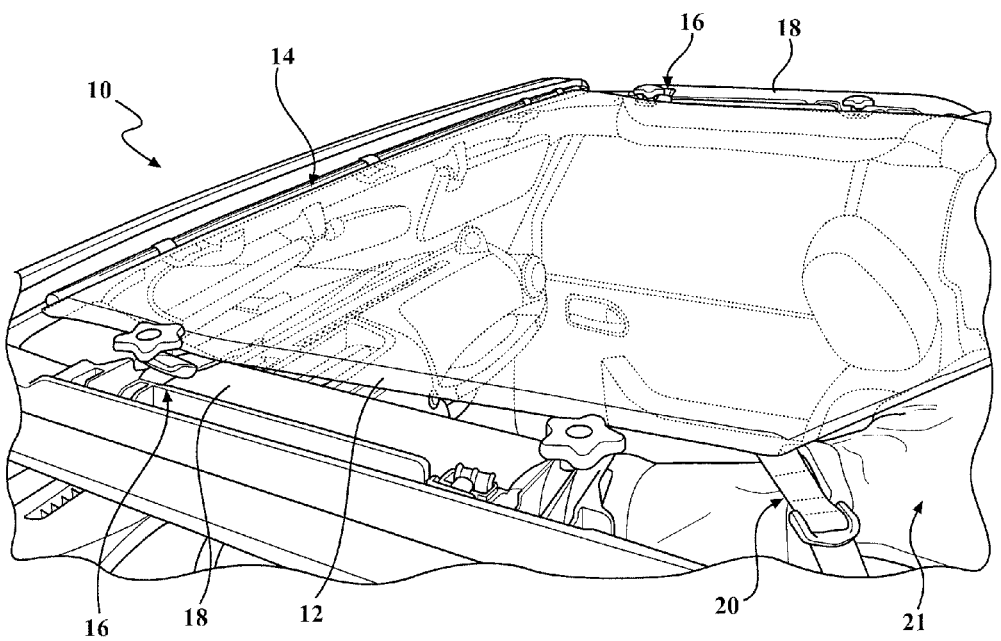
FIG. 1 is a rear perspective view of a fabric cover assembly over a vehicle cockpit depicting the fabric cover assembly having a fiber windshield rod in an installed position, in accordance with the present invention.
Figure 2:
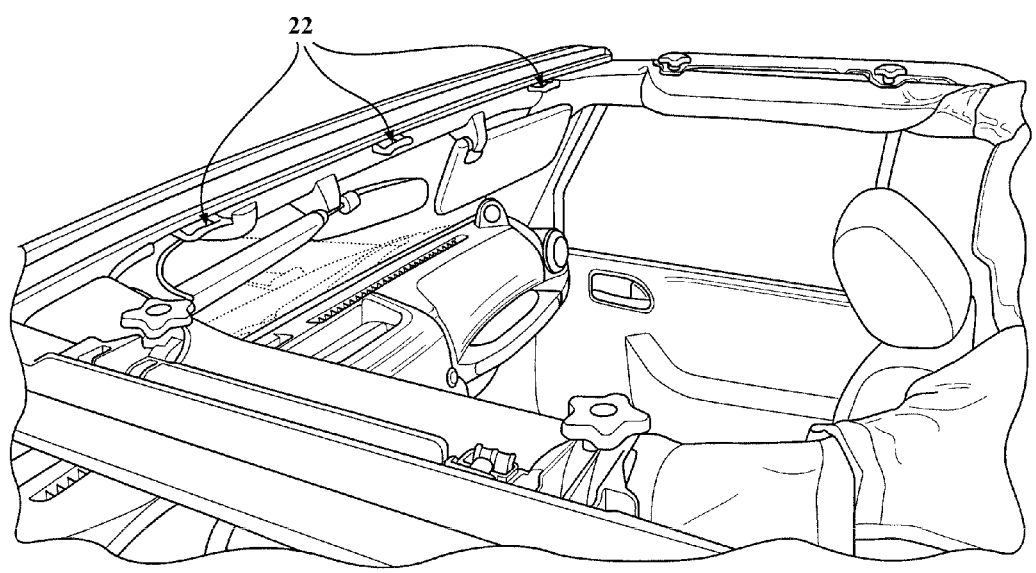
FIG. 2 is a rear perspective view of a vehicle cockpit showing a plurality of footman loop portions of the fabric cover assembly, in accordance with the present invention.
Figure 3:
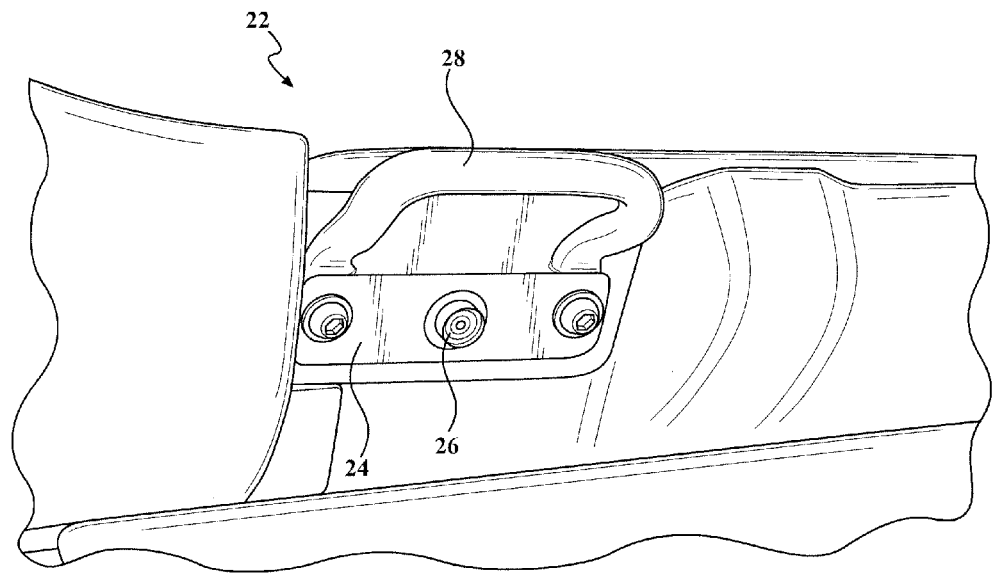
FIG. 3 is an enlarged perspective view of the footman loop portion, in accordance with the present invention.
Figure 4:
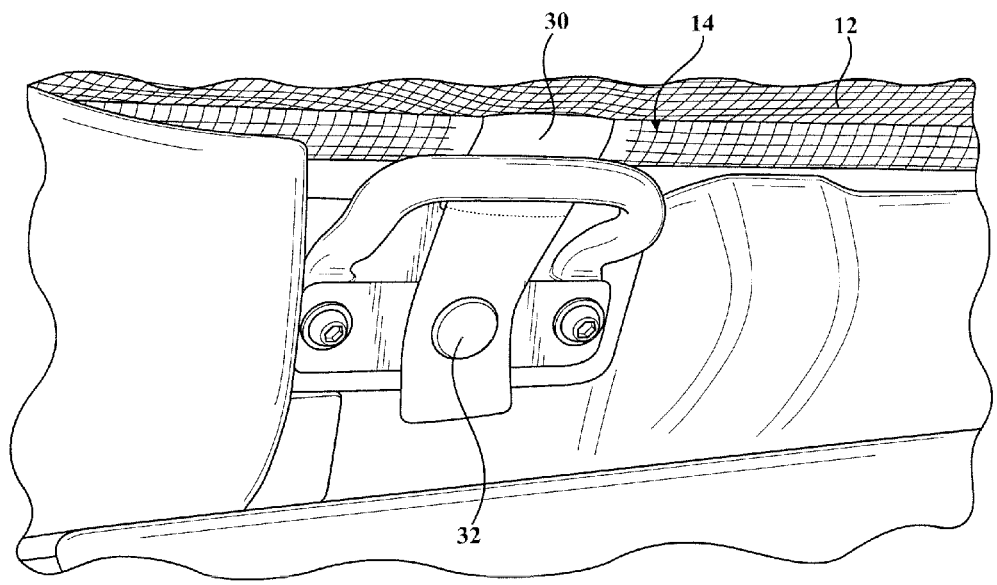
FIG. 4 is an enlarged perspective view of the footman loop portion connected to a web strap of the fiber windshield rod, in accordance with the present invention.

Referring to FIGS. 1-4 generally, there is provided a cover assembly shown generally at 10 having a cover 12, which is formed of fabric and/or mesh fabric material, a fiber windshield rod shown generally at 14, a plurality of straps shown generally at 16 attached to sport bars 18 of a vehicle, a plurality of rear straps shown generally at 20 for attaching to sport bars and/or a crossmember shown generally at 21 of the vehicle, and a plurality of footman loop portions shown generally at 22.

The fiber windshield rod 14 is an integrated rod attachment for connecting the cover 12 to an upper windshield area of the vehicle. The fiber windshield rod 14 is of a composite, most preferably, carbon fiber, or other material suitable for providing strength and structure. In particular, the fiber windshield rod 14 provides structure that conforms the fabric cover 12 to the windshield contour, which is additionally a significant advantage over typical systems that have gaps between the fabric and windshield. The fiber windshield rod 14 is operably sized and contoured for the fabric cover 12 to extend along the windshield area. By way of non-limiting example, the fiber windshield rod 14 has a predetermined diameter, and has a predetermined bow or curve to generally follow the interior surface of the windshield area so that the fabric conforms to the windshield contour depending on the application.

The fiber windshield rod 14 is held in place in the windshield area by the plurality of windshield footman loop portions 22, e.g., at least three footman loop portions 22. Each windshield footman loop portion 22 includes a plate 24 connected to the upper interior windshield area within a recess or depression. The plate 24 has at least one snap stud 26 located below a footman loop 28. A web strap 30 has a snap eyelet 32 for snapping to the snap stud 26. The web strap 30 extending from the cover 12 is operably coupled to the fiber windshield rod 14, e.g., loops around the rod 14 and is sewn creating a loop with the rod 14, and extends generally downward through the footman loop 28 and the snap eyelet 32 connects to the snap stud 26. The fabric windshield rod 14 is thereby held in place utilizing the plurality of windshield footman loop portions 22/28 attached with a snap stud plate 24, web strap 30 and snap eyelet 32. This eliminates the need for metal stamp windshield channels, latches, knobs etc. It also allows for easy removal and fold back of the cover assembly 10 so OEM fabric soft tops and hard tops can be installed over the cover assembly 10 so the cover assembly 10 can be left installed as a liner or sunshade.

Preferably, depending on the application segments of the fiber windshield rod 14 are additionally positioned behind (and/or over top) portions of the molding (see FIG. 4), e.g., the molding along an upper windshield area adjacent the windshield footman loop portions 22, to further secure the fiber windshield rod 14 in place in combination with the windshield footman loop portions 22.

The sides and rear edges of the cover assembly 10 are connected to the vehicle using at least a plurality of straps, e.g., side straps 16 and rearward straps 20. Depending on the application these straps may be tension straps and/or operably configured with straps and fastening features suitable for selectively tightening the straps to secure the cover assembly 10 to the vehicle. The plurality of straps, e.g., at least two side straps 16, connect the sides of the cover assembly 10 to the respective side sport bars 18 along the vehicle. Preferably, at least one side strap 16 is located toward each front corner and connected to the respective sport bar 18. A plurality of rear straps, e.g., at least two rear straps 20, connect the rearward edge of the cover assembly 10 to the respective side sport bars 18 and/or crossmember 21 and/or rear of the vehicle. Additional straps and/or fasteners may be arranged to further selectively connect the rearmost edge of the cover assembly 10 to the crossmember 21 and/or rear of the vehicle without. By way of non-limiting example, straps extending from the back of the cover 14 may be looped on the crossmember 21 and/or through openings left from removing mushroom knobs from the crossmember 21. Other strap 16, 18 locations within the scope of the present invention are contemplated depending on the application to generally connect with various body structures.

The right half of the cover assembly 10 and corresponding features are substantially mirror image/symmetrical to the left half of the cover assembly 10 and corresponding features depicted in the figures.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cover assembly for a vehicle, comprising:
   a fabric cover formed of a soft and/or mesh fabric material;
   a plurality of footman loop portions attached to the vehicle, wherein the plurality of footman loop portions are located on an interior upper windshield area, wherein the plurality of footman loop portions further comprise a plurality of plates, wherein each plate attaches a respective one of the plurality of footman loop portions onto the interior upper windshield area;
   a windshield rod coupled to the fabric cover and operably fastened to the plurality of footman loop portions to retain the front of the fabric cover; and
   a plurality of straps coupled to the fabric cover and attached to the vehicle to connect at least the sides of the fabric cover to the vehicle;

a plurality of web straps coupled to the windshield rod, wherein each of the plurality of web straps connects to a respective one of the plurality of plates;

at least one snap stud on each of the plurality of plates, wherein the plurality of web straps each have at least one snap eyelet for connecting to respective snap studs.

2. The cover assembly according to claim 1, wherein the plurality of plates are attached within depressions formed in the interior upper windshield area.

3. The cover assembly of claim 1, wherein the plurality of web straps loop around the windshield rod and are sewn to the fabric cover.

4. The cover assembly of claim 1, wherein the plurality of footman loop portions further comprise a plurality of footman loops receiving the plurality of web straps.

5. The cover assembly of claim 1, wherein the windshield rod is a fiber windshield rod sewn within a front edge of the fabric cover.

6. The cover assembly of claim 5, wherein the fiber windshield rod is carbon fiber.

7. The cover assembly of claim 1, wherein the plurality of straps are tension straps for tightening the fabric cover to the vehicle.

8. The cover assembly of claim 1, wherein the plurality of straps includes at least two side straps connected to side sports bars and at least two rearward straps connected to side sports bars and/or a crossmember of the vehicle.

9. A cover assembly for a vehicle, comprising:
a cover formed of a soft and/or mesh fabric material;
a plurality of web straps connected to the cover;
a plurality of footman loop portions attached to an interior windshield portion, wherein the plurality of footman loop portions further comprise a plurality of plates, wherein each plate attaches a respective one of the plurality of footman loop portions onto the interior windshield area;

a fiber windshield rod coupled to the plurality of web straps for connecting the cover to the plurality of footman loop portions;

at least one snap stud on each of the plurality of plates, wherein the plurality of web straps each have at least one snap eyelet for connecting to respective snap studs; and a plurality of straps to connect said cover to sport bars and/or a crossmember of the vehicle.

10. The cover assembly of claim 9, wherein the plurality of web straps loop around the windshield rod and are sewn to the fabric cover.

11. The cover assembly of claim 9, wherein the fiber windshield rod is a composite.

12. The cover assembly of claim 9, wherein the plurality of straps are located near the corners of the cover for tightening the fabric cover to the sports bars and/or a crossmember of the vehicle.

13. A cover assembly for a sports utility vehicle, comprising:
a cover formed of a soft and/or mesh fabric material;
a plurality of web straps connected to the cover;
a plurality of footman loop portions attached to an interior windshield portion;
a fiber windshield rod coupled to the cover and web straps to fasten the web straps to the interior windshield area using the plurality of footman loop portions; and
a plurality of straps to connect the cover to sport bars of the vehicle;
wherein each of the plurality of footman loop portions further comprises:
at least one plate;
at least one snap stud; and
at least one footman loop;
wherein the web strap extends through the footman loop and the snap eyelet snaps to said snap stud.

* * * * *